(12) United States Patent
Geiger et al.

(10) Patent No.: US 6,539,798 B1
(45) Date of Patent: Apr. 1, 2003

(54) ACCELERATION THRESHOLD SENSOR

(75) Inventors: Wolfram Geiger, Filderstadt (DE); Heinz Kück, Langebrück (DE); Axel Erlebach, Dresden (DE); Wolf-Joachim Fischer, Dresden (DE)

(73) Assignee: Fraunhofer-Gesellschaft zur Forderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 09/242,783

(22) PCT Filed: Aug. 30, 1996

(86) PCT No.: PCT/EP96/03821

§ 371 (c)(1),
(2), (4) Date: Sep. 24, 1999

(87) PCT Pub. No.: WO98/09174

PCT Pub. Date: Mar. 5, 1998

(51) Int. Cl.⁷ ............................. G01P 15/00; C23F 1/00; H01L 21/00
(52) U.S. Cl. ................. 73/488; 216/2; 438/52
(58) Field of Search ............................. 73/1.38, 514.01, 73/488; 216/2; 438/52

(56) References Cited

FOREIGN PATENT DOCUMENTS

| DE | 748 408 C | 11/1944 | |
|---|---|---|---|
| JP | 58 106463 A | 9/1983 | |
| JP | 62-36561 | 2/1987 | ........... G01P/15/06 |
| JP | 5-142243 | 6/1993 | ........... G01P/15/00 |
| WO | WO 91/11722 | 8/1991 | |

Primary Examiner—Richard A. Moller
(74) Attorney, Agent, or Firm—Wolf, Greenfield & Sacks, PC

(57) ABSTRACT

An acceleration threshold sensor includes a supporting device, a seismic mass, and a connecting device with the aid of which the seismic mass is attached to the supporting device. The connecting device is provided with a predetermined breaking point interrupting the connection between the seismic mass and the supporting device when said seismic mass is subjected to an acceleration exceeding a predetermined acceleration. This sensor has a simple structural design, can be produced at a reasonable price and is always ready to carry out a measurement. Additionally, this sensor is able to store, without any auxiliary power, that it has been subjected to an acceleration exceeding a predetermined acceleration.

7 Claims, 4 Drawing Sheets

ACCELERATION THRESHOLD SENSOR

FIELD OF THE INVENTION

The present invention refers to an acceleration threshold or acceleration limit value sensor and to a method of producing an acceleration threshold or acceleration limit value sensor.

1. Description of Background Art

According to the background art, it is known to use macroscopic mechanical arrangements for supervising acceleration and shock events, e.g. during the transport of valuable, sensitive goods. Such an arrangement comprises a transparent plastic container with a metal ball held by four springs at a position of rest. When a mechanical acceleration or a shock load above a limit value occurs, the ball leaves its position of rest. Subsequently, it can be found out by optical inspection whether such a known limit value sensor has been subjected to an acceleration or shock load above a limit value. Such macroscopic mechanical arrangements are complicated. In addition, such known arrangements can only be read optically, i.e. by observation.

In the field of technology, numerous applications of micromechanical structures for detecting accelerations, speeds and forces are additionally known. By means of such micromechanical structures, e.g. acceleration detections can be carried out by means of capacitive measurements as well as other measurement principles, e.g. by closing contacts. Such micromechanical structures are, however, not able to store information on the detected accelerations mechanically and therefore without auxiliary power.

2. Description of Prior Art

DE 748 408 C shows a maximum acceleration meter in the case of which a maximum acceleration is related to a permanent deformation or to the breaking of a structural material. For this purpose, rods, which are formed of a brittle or permanently deformable structural material, are connected to a base plate on one side thereof, whereas the non-fixed ends of the rods have masses attached thereto. The cross-section of such a rod having a mass attached thereto, which is subjected to the highest stress, and, consequently, the predetermined breaking point is the respective point where the rod is fixed in the base plate. It follows that, a maximum acceleration to be determined can be detected according to DE 748 408 C on the basis of a breaking of said rods.

WO-A-9111722 describes a semiconductor acceleration sensor consisting of a fastening section, an etched silicon spring and a mass attached to said spring. A resistance loop is provided over the length of the spring, said resistance loop constituting a spring break indicator. This spring break indicator serves to indicate the readiness for operation of the acceleration sensor disclosed in WO-A-9111722 or a damaged condition of said acceleration sensor. WO-A-9111722 does not disclose an acceleration threshold sensor in which the breaking of a predetermined breaking point is intended to indicate the occurrence of an acceleration exceeding a predetermined acceleration.

SUMMARY OF THE INVENTION

It is the object of the present invention to provide an acceleration threshold sensor which has a simple structural design, which can be produced at a reasonable price and is always ready to carry out a measurement, and which is also able to store, without any auxiliary power, that the sensor has been subjected to an acceleration exceeding a predetermined acceleration.

This object is achieved by an acceleration threshold sensor sensor comprising a supporting device; a seismic mass; and a connecting device with the aid of which the seismic mass is attached to the supporting device, said connecting device being provided with a predetermined breaking point interrupting the connection between the seismic mass and the supporting device when said seismic mass is subjected to an acceleration exceeding a predetermined acceleration, wherein the supporting device, the seismic mass and the connecting device are formed integrally from a silicon layer by means of a micromechanical method in such a way that the silicon layer is provided with an opening extending therethrough and having arranged therein the seismic mass, the border of said opening defining the supporting device, the seismic mass being connected on a first side thereof to the neighbouring side of the supporting device by a first bar-shaped connection piece which defines the predetermined breaking point, and said seismic mass being connected to the side of the supporting device located opposite said neighbouring side by means of a second and a third connection piece, said second and third connection pieces being connected to the seismic mass in the area of the first side of said seismic mass and extending symmetrically on both sides of the seismic mass to the opposite side of the supporting device, said second and third connection pieces being implemented such that they do not substantially influence the mechanical properties of the seismic mass.

In the case of the acceleration threshold sensor according to the present invention, the support means, the seismic mass and the connection means are formed integrally from a semiconductor layer by means of a micromechanical method in such a way that the predetermined breaking point of the connection means is formed by a configuration of the semiconductor layer. Such an acceleration threshold sensor has a simple structural design, it can be produced at a reasonable price, it is always ready to carry out a measurement and it does not, in principle, require any auxiliary power for functioning. In special circumstances, the sensor according to the present invention can be used in an advantageous manner in battery-operated systems in long-term operation, where it will consume a minimum amount of energy, and it can be read electrically at an arbitrary time.

The micromechanical acceleration threshold sensor is provided with breaking structures consisting of a seismic mass in the form of a board or a similar structure and of a substrate and bars which are secured to the mass. These breaking structures can define a conductor loop which is interrupted when the bars break. Hence, the threshold sensors according to the present invention can be read electrically or also optically, e.g. by visual inspection. Such breaking structures can be used as sensors for limit accelerations of all kind, as detection means for specific stress events of devices and, when several such breaking structures are arranged in the form of an array in a system, they can be used as digital acceleration sensors.

A further object of the present invention is to provide a method of producing an acceleration threshold sensor.

This object is achieved by a method of producing an acceleration threshold sensor including a supporting device, a seismic mass, and a connecting device with the aid of which the seismic mass is attached to the supporting device, said connecting device being provided with a predetermined breaking point interrupting the connection between the seismic mass and the supporting device when said seismic mass is subjected to an acceleration exceeding a predetermined acceleration, said method comprising the following steps or acts: providing a SIMOX substrate or another SOI substrate or a silicon substrate provided with a silicon oxide layer or a silicon start layer; depositing a silicon epitaxial layer or a silicon CVD layer on a thin silicon film of the SIMOX substrate or on an oxide layer of the SOI substrate or on the silicon start layer; producing a conducting-path system and a contacting system on the silicon layer deposited in the previous step; producing and structuring a passivation layer over the silicon layer deposited in the second step and the conducting-path system and the contacting system, with the property that this layer acts as an etching mask during a subsequent trench-etching process; producing a back mask and carrying out a back-etching process, an oxide layer of the SIMOX substrate, an oxide layer of the SOI substrate or an oxide layer provided on the silicon start layer acting as an etch stop; carrying out etching from the back of the structure for removing the oxide layer; applying a protective layer to and structuring same on the front of the structure and applying a protective layer to the back of the structure; carrying out a subsequent trench-etching process so as to form and expose the seismic mass and the connection means of the acceleration threshold sensor; and removing the protective layers.

BRIEF DESCRIPTION OF THE DRAWINGS

In the following, preferred embodiments of the present invention will be explained in detail with reference to the drawings enclosed, in which.

DETAILED DESCRIPTION

By means of a micromechanical acceleration threshold sensor according to the present invention, it can be detected when limit accelerations or shocks are exceeded, and the occurrence of such limit accelerations or shocks can be stored so that, e.g. in the case of a valuable, sensitive device, such stress events can be proved. This is possible due to the fact that the acceleration threshold sensor according to the present invention is provided with a breaking structure including a predetermined breaking point which breaks in response to a specific acceleration. In the case of preferred embodiments, the predetermined breaking point is part of a current loop, said current loop being interrupted when the predetermined breaking point breaks. This interruption of the current loop can be detected later on by applying a voltage. Alternatively, the breaking can be decteted by visual observation. If an array of breaking structures for various accelerations is used, information about the magnitude of the acceleration load can be obtained.

The present invention is based on the fact that the breaking structure deforms in response to an acceleration load, whereby a mechanical stress builds up, the bar or the bars, which act as a connecting means between the seismic mass and a support, breaking at a predetermined breaking point when this mechanical stress exceeds a predetermined known value. The breaking of the bars interrupts e.g. a conductor loop and this has the effect that, when a voltage is applied later on, no current will flow. This indicates that the structure has been subjected to an acceleration load which exceeded a specific limit value. Alternatively, the structure can, however, also be read optically by inspection or by means of a slightly magnifying optical device.

According to preferred embodiments of the present invention, the acceleration threshold sensors are manufactured as microchips making use of silicon technology. The wafers used for this purpose are e.g. SIMOX wafers or other SOI wafers.

Figure 1:
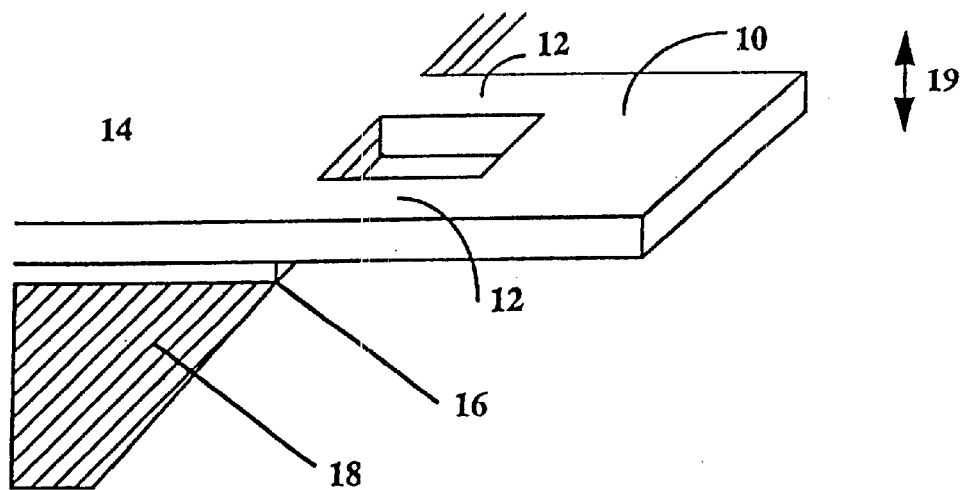
FIG. 1 shows a schematic, perspective view of a first embodiment of an acceleration threshold sensor according to the present invention.
Figure 2:
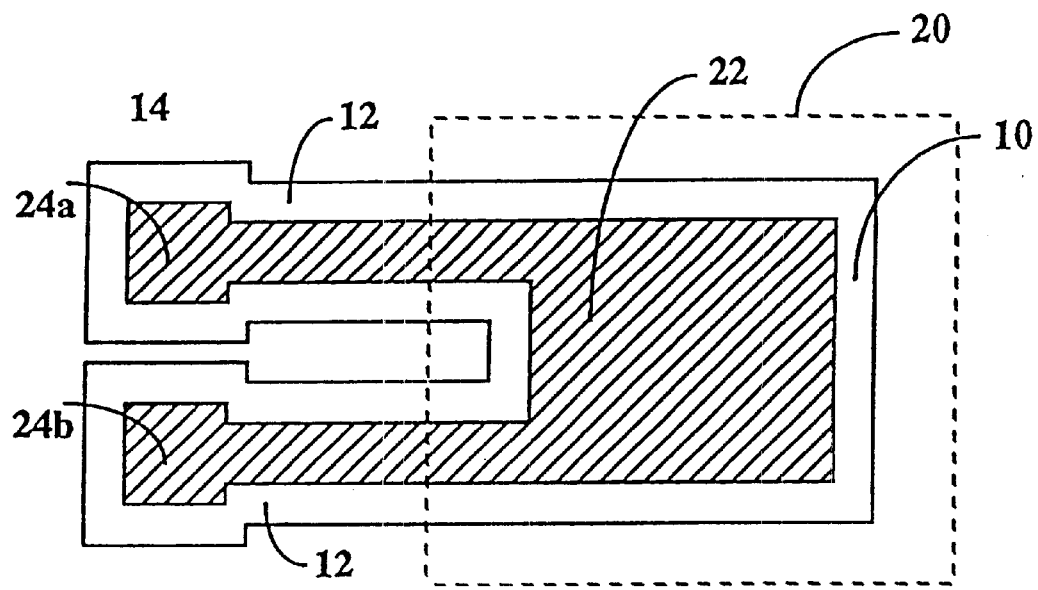
FIG. 2 shows a schematic top view of the acceleration threshold sensor according to FIG. 1.

FIGS. 1 and 2 show a first embodiment of an acceleration threshold sensor produced according to the present invention. The acceleration threshold sensor comprises a seismic mass 10 connected to a support means, designated generally by 14, via two bars 12 acting as a connection means. In accordance with the embodiment shown, the seismic mass 10, the bars 12 and the support means 14 are formed integrally from a planar silicon layer. In the area of the support means 14, the silicon layer is provided on a silicon oxide layer 16. The silicon oxide layer 16, is, in turn, provided on a silicon substrate 18.

The bars 12 and, consequently, the predetermined breaking point of this embodiment of an acceleration threshold sensor according to the present invention are implemented such that they are sensitive to accelerations at right angles to the plane of the chip, i.e. accelerations in the direction of the arrow 19 in FIG. 1. This means that the predetermined breaking points will break, when the seismic mass 10 is subjected to by an acceleration in the direction of the arrow 19 which exceeds a predetermined acceleration.

FIG. 2 shows a schematic top view of the acceleration threshold sensor shown in FIG. 1, the components shown in said FIG. 2 being only the seismic mass 10, the bars 12 and the part of the support means 14 consisting of the silicon layer. The broken line 20 identifies the part of the silicon layer which "breaks off" when the acceleration threshold sensor is subjected to an acceleration exceeding the predetermined acceleration value. FIG. 2 additionally shows a conducting path 22 which is applied to the silicon layer. This conducting path 22 is provided with contacts 24a and 24b by means of which it can be detected, by the application of a voltage, when the acceleration threshold sensor has been subjected to by an acceleration exceeding the limit acceleration, i.e. when the part outlined by the broken line 20 has "broken off". In this case, the closed current path defined by the conducting path 22 is interrupted.

Figure 3:
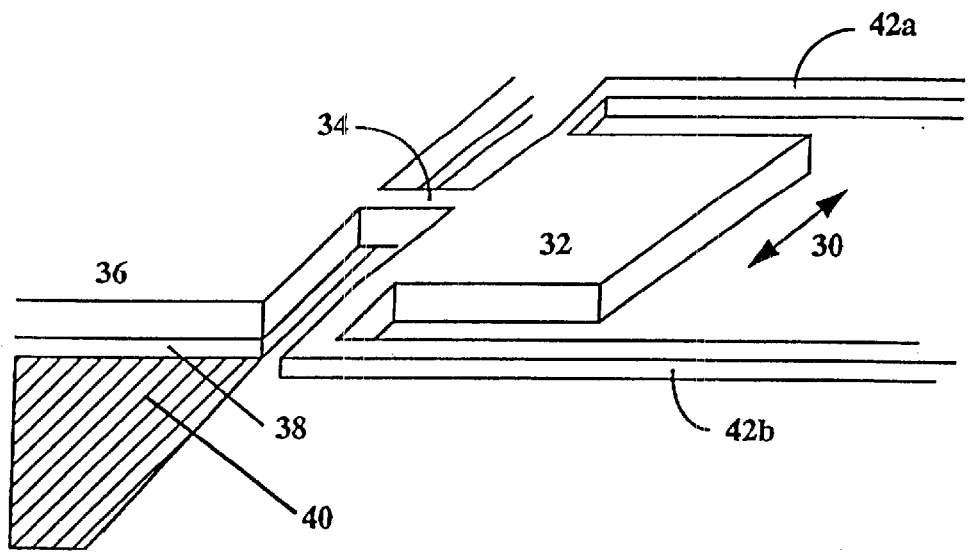
FIG. 3 shows a schematic, perspective view of a second embodiment of an acceleration threshold sensor according to the present invention.
Figure 4:
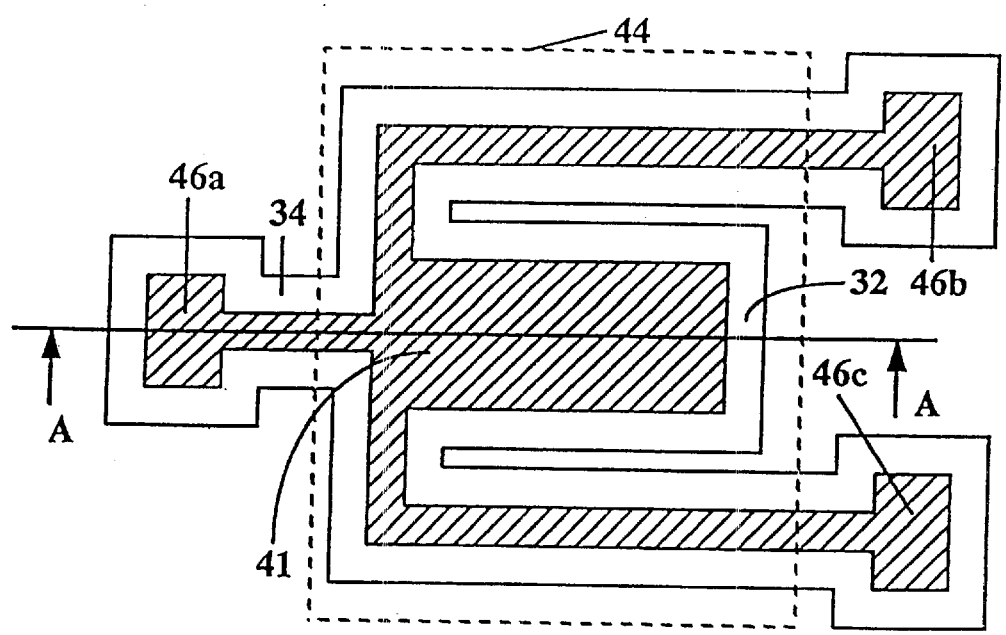
FIG. 4 shows a schematic top view of the acceleration threshold sensor according to FIG. 3.

In FIGS. 3 and 4, an embodiment of an acceleration threshold sensor according to the present invention is shown. This sensor is implemented such that it is sensitive to accelerations in the chip surface, i.e. accelerations in the direction of the arrow 30 in FIG. 3. Also in the case of this embodiment, a seismic mass 32, a connection means, which is defined by a bar 34, and a support means 36 are formed integrally from a silicon layer. The part of the silicon layer 36 forming the support means is provided on an oxide layer 38 which is provided on a silicon substrate 40.

When the seismic mass 32 is subjected to an acceleration exceeding a predetermined acceleration in the direction of the arrow 30, the bar 34, which defines the connection means between the seismic mass 32 and the support means 36, will break. As can be seen in FIG. 4, a conducting path 41 can again be applied to the silicon layer. This conducting path can be dispensed with, when the silicon layer itself is doped in such a way that it is current carrying. As can additionally be seen in FIGS. 3 and 4, thin connections 42a, 42b, which are formed from the silicon layer, are attached to the seismic mass 32. These connections 42a and 42b establish a further connection to the part of the silicon layer defining the support means. The connections 42a and 42b, which act as a current supply, are geometrically designed in such a way that the mechanical properties of the system are not substantially influenced thereby.

In FIG. 4, the part of the sensor device which will "break off" when the acceleration threshold sensor is subjected to an acceleration exceeding a predetermined acceleration is outlined by broken lines 44. The conducting path is formed over the support means, the bar 34 and the connections 42a and 42b in such a way that the current path is interrupted when the acceleration threshold sensor has been subjected to an excessive acceleration. This can be detected electrically by applying a voltage to two of the contacts 46a, 46b and 46c.

Figure 5:
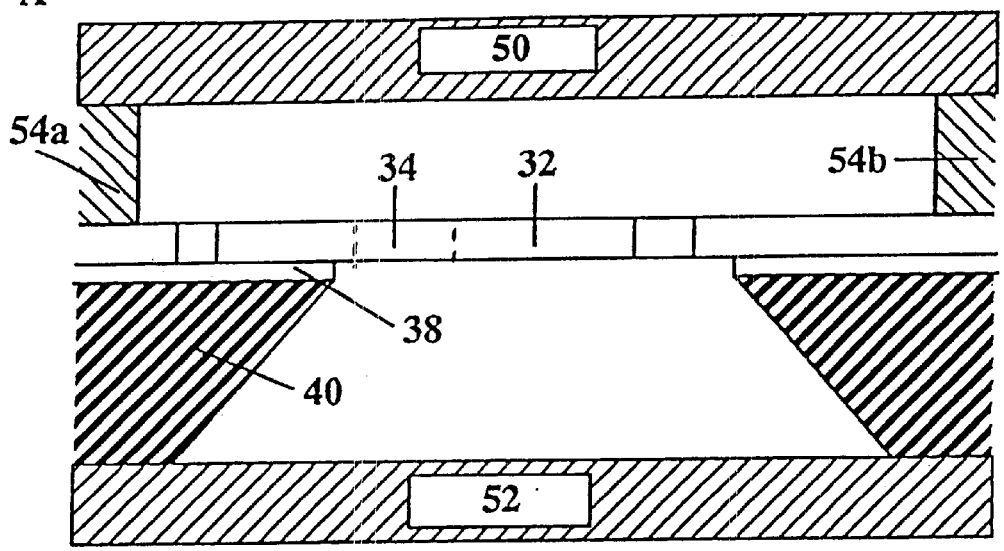
FIG. 5 shows a schematic sectional view of the second embodiment of the acceleration threshold sensor along line A—A of FIG. 4.

FIG. 5 shows a schematic sectional view of the acceleration threshold sensor shown in FIGS. 3 and 4 along the line A—A in FIG. 4. From this representation, it can be seen how the acceleration threshold sensor has been produced from a system consisting of a silicon layer, an oxide layer 38 and a silicon substrate 40. For producing the acceleration threshold sensor, the silicon layer is first structured such that the structure shown in FIG. 3 is obtained. Subsequently, the silicon substrate 40 and the silicon oxide layer 38 are etched away below the breaking structure which "breaks off" in response to excessive acceleration. The etching of the silicon layer, silicon substrate and oxide layer can also take place in a different sequence. The finished structure is then enclosed by means of covers 50 and 52. The cover 52 is attached to the bottom side of the silicon substrate 40. The cover 50 is attached via connection means 54a and 54b to the silicon layer in which the sensor structure is formed. Such covers protect the sensor structure against contamination, destructions or other impairments.

Figure 6:
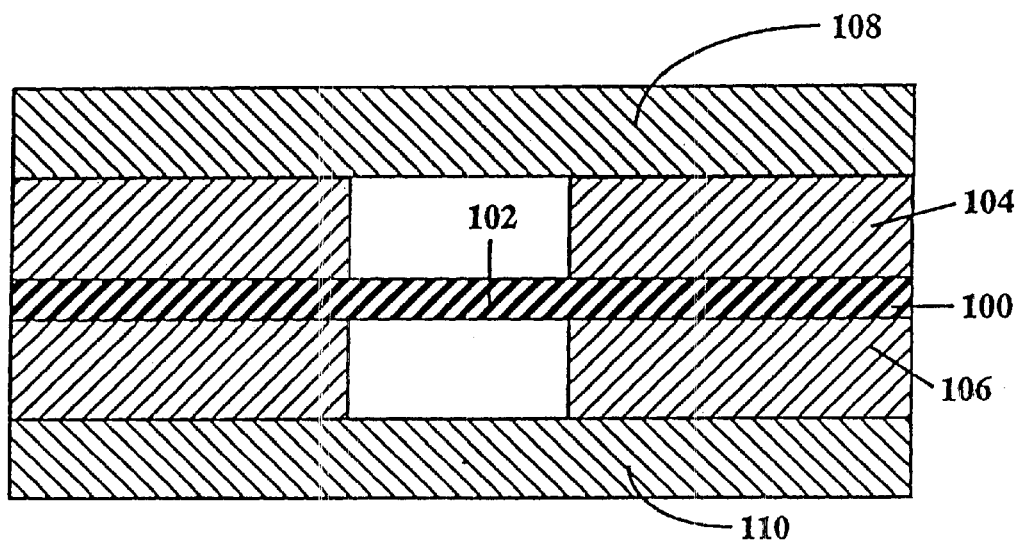
FIG. 6 shows a rough, schematic sectional view of an embodiment of an acceleration threshold sensor according to the present invention.

In the following, suitable methods of producing an acceleration threshold sensor according to the present invention will be discussed, partly with reference to FIG. 6. FIG. 6 is a schematic cross-sectional view, which roughly shows the components of a sensor according to the present invention. In a board or wafer 100, a breaking structure 102 is formed. On one or, alternatively, on both sides of the wafer 100, support layers 104 and 106, respectively, are provided. The support layers have been removed in the area of the breaking structure 102. The support layers 104 and 106 have attached thereto covers 108 and 110 protecting the breaking structure 102, which is formed in the wafer 100, from both exposed sides. It is apparent that, when one of the covers or both covers 108 and 110 are not provided, one of the support layers 104 or 106 can be dispensed with. The support layer 104 or 106 can also be dispensed with when the covers 108 and 110 are implemented in a suitable manner.

The breaking structure of the acceleration threshold sensor according to the present invention is structured in a suitable material, which, in the case of future electric reading, is preferably conductive and which is provided in the form of a thin layer or board. The structuring is carried out e.g. by simple mechanical methods, such as punching, cutting or sawing, laser separation processes, lithographic processes, etching processes or the like. The breaking structure can be fixedly connected to one of the support layers 104, 106 during the structuring, the support layer being either a non-conductive layer or an insulator (not shown) being arranged between the support layer and the board in which the breaking structure is formed. The support and the possibly existing insulating layer below the breaking structure 102 are removed below the breaking structure. Alternatively, the breaking structure can also be connected to a support layer after the structuring by means of joining techniques, e.g. by means of glueing or by anodic bonding or other joining methods, the support layer being again a non-conductive layer or an insulator (not shown) being arranged between the support layer and the breaking structure. A support layer can also be provided on the other side of the board 100 in the same way. These support layers 104 and 106 can have attached thereto covers 108 and 110 as a protection against contaminations, destructions or other impairments of the breaking structure 102. When the covers 108 and 110 are implemented in a suitable way, the support layers can be dispensed with.

Figure 7:
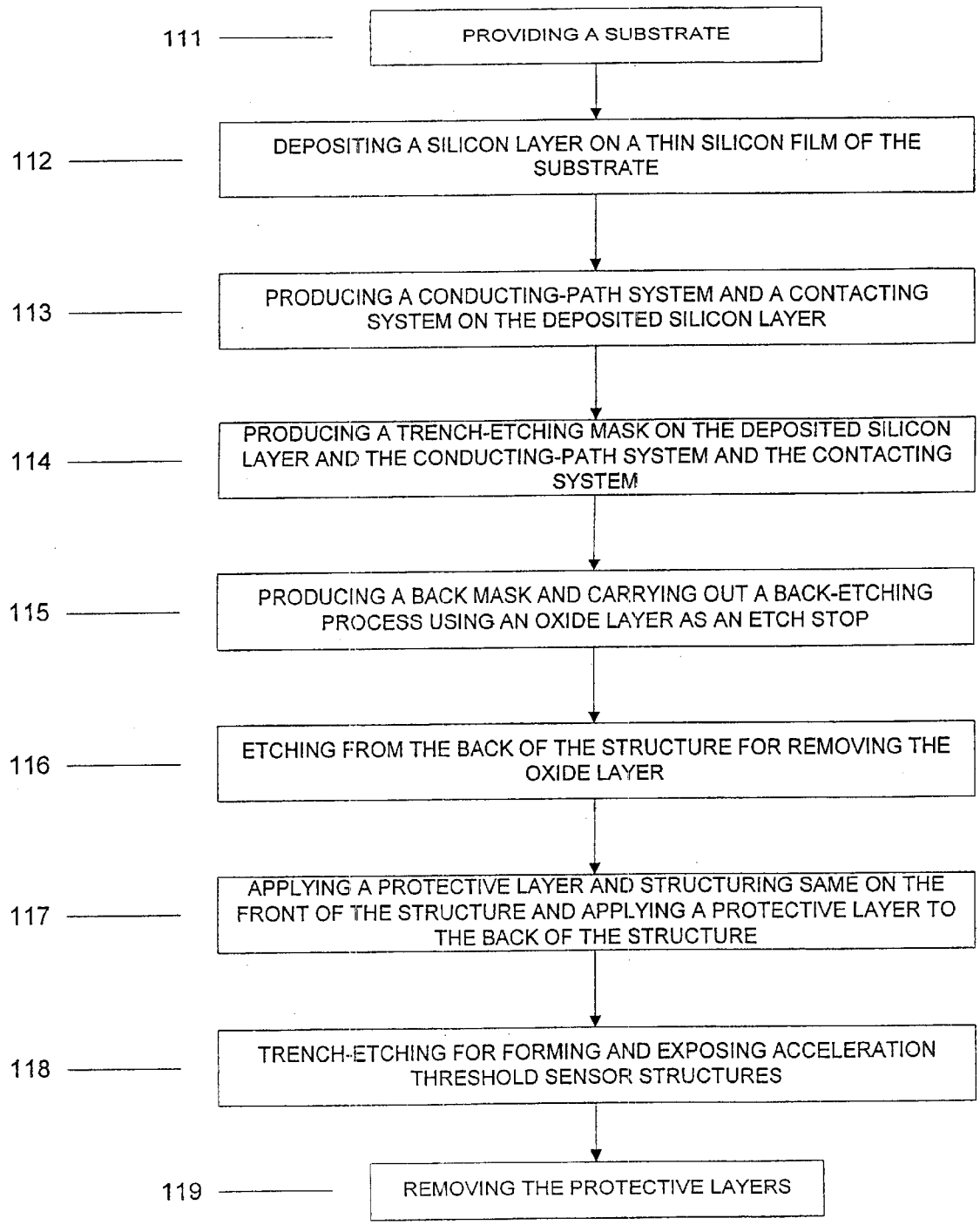
FIG. 7 shows method steps of producing an acceleration threshold sensor.

FIG. 7 shows a method of producing an acceleration threshold sensor including a supporting device, a seismic mass, and a connecting device with the aid of which the seismic mass is attached to the supporting device, said connecting device being provided with a predetermined breaking point interrupting the connection between the seismic mass and the supporting device when said seismic mass is subjected to an acceleration exceeding a predetermined acceleration. The method shown in FIG. 7 comprises the following steps or acts: providing a substrate (111); depositing a silicon layer on a thin silicon film of the substrate (112); producing a conducting-path system and a contacting system on the silicon layer deposited in 112 (113); producing a trench-etching mask on the deposited silicon layer and the conducting-path system and the contacting system (114); producing a back mask and carrying out a back-etching process using an oxide layer as an etch stop (115); carrying out etching from the back of the structure for removing the oxide layer (116); applying a protective layer to and structuring same on the front of the structure and applying a protective layer to the back of the structure (117); carrying out a trench-etching process so as to form and expose the acceleration threshold sensor structures (118); and removing the protective layers (119).

In the following a method of producing an electrically readable breaking structure will be explained in detail. On the thin upper silicon film of a SIMOX wafer, an additional silicon layer having a suitable thickness for adjusting the acceleration limit value is applied by epitaxy. Following this, the conducting-path and contact system with the conductor loop are produced. The conductor loop can be formed by an aluminium metallization or by doping the silicon itself.

After the application of a trench-etching mask and a back mask, anisotropic etching of the silicon is carried out from the back, and the buried oxide is removed in a wet-chemical process so as to expose the area of the breaking structures from below. Subsequently, trench etching is carried out, which results in structuring of the breaking structures themselves. These etchings can also be carried out in a different sequence. In the case of the acceleration threshold sensors shown in FIGS. 2 and 4, the contours of the silicon layer shown result from trench etching.

In the following, dicing and housing of the chips with the breaking structures is carried out; prior to the sawing or dicing, the chips are protected by a suitable protective layer, which is, however, removed after the sawing process. Alternatively, the chips can be provided, as can be seen in FIG. 6, with a lower and an upper cover e.g. by anodic bonding or glueing prior to the sawing or dicing.

It follows that, in accordance with the preferred embodiment for producing an acceleration threshold sensor according to the present invention, a layer sequence silicon substrate/sacrificial oxide layer/silicon layer is first produced by processing a silicon wafer. The sacrificial oxide layer can be produced e.g. on the basis of a SIMOX process or on the basis of oxide deposition. The layer of material in which the breaking structure is formed later on can be produced e.g. by epitaxial growth of silicon on the silicon film of an SOI wafer or by deposition of polysilicon. Following this, the rear removal of the substrate and of the oxide below the breaking structure is carried out by back etching. When these process steps, which are mostly carried out wet-chemically or in the vapour of an etching agent, have been performed, the sensor structures are produced by plasma-technological trench etching. In so doing, the SOI wafer can be covered fully or partly with a suitable protective layer, e.g. a photoresist, from the side that is not subjected to etching so as to avoid a change of the plasma-etching process, which would be detrimental to the process, when etching through of the layer 100 begins. This protective layer is subsequently removed by plasma-technological means. Due to the trench etching and the removal of the protective layer, the sensor structure is rendered movable and sensitive to accelerations. The present method uses for the trench-etching process a mask of the usual passivation layers such as of silicon oxide, silicon nitride or silicon oxynitride. This layer is deposited with sufficient thickness and structured in the usual way so that the metal contacting surfaces of the components, the bonding pads, are exposed and so that the etching mask for the trench etching is simultaneously produced in accordance with the present invention. Prior to the trench-etching process, the metal contacting surfaces are covered by a protective layer, e.g. a photoresist, in such a way that they will not be damaged during trench etching. The protective layer is removed after the trench etching. The trench-etching process can also be carried out via a photoresist mask. Following this, an upper and a lower cover can be applied preferably by anodic bonding.

By means of the above-described production method, different microstructures can be produced. This method can, for example, also be used for producing acceleration sensors which are sensitive to accelerations in the chip surface or to accelerations at right angles to the chip surface, gyroscopes as well as other microelectromechanical structures.

The production method is advantageous insofar as, on the one hand, the movability of the sensor structure is achieved by a dry plasmatechnological process. Hence, this method avoids the risk of the known adherence of the movable sensor structure and of the immovable rest of the layer 100, said adherence occurring due to cohesion and adhesion forces in connection with the removal of the etching medium after etching with a liquid etching medium or the vapour of the etching medium as an etching medium. In addition, in comparison with known methods, the risk of future adherence is dramatically reduced due to the fact that the silicon substrate has been removed in the area of the sensor structure 32 so that adherence cannot occur there.

It follows that the present invention provides a micromechanical acceleration threshold sensor which is adapted to be used as a sensor for limit accelerations of all kind, as a detector means for specific stress events of devices and, produced in the form of an array, as a digital acceleration sensor. The acceleration threshold sensor according to the present invention has a simple structural design, it can be produced at a reasonable price and it is always ready to carry out a measurement. Furthermore, the acceleration threshold sensor according to the present invention is adapted to be read preferably electrically. The sensor according to the present invention can therefore be used advantageously for supervising acceleration and shock events during the transport of valuable, sensitive goods.

What is claimed is:
1. A method of producing an acceleration threshold sensor including a supporting device, a seismic mass, and a connecting device with the aid of which the seismic mass is attached to the supporting device, said connecting device being provided with a predetermined breaking point interrupting the connection between the seismic mass and the supporting device when said seismic mass is subjected to an acceleration exceeding a predetermined acceleration, said method comprising the following steps:
   a) providing a SIMOX substrate or another SOI substrate or a silicon substrate provided with a silicon oxide layer or a silicon start layer;
   b) depositing a silicon epitaxial layer or a silicon CVD layer on a thin silicon film of the SIMOX substrate or on an oxide layer of the SOI substrate or on the silicon start layer;
   c) producing a conducting-path system and a contacting system on the silicon layer deposited in step b);
   d) producing and structuring a passivation layer over the silicon layer deposited in step b) and the conducting-path system and the contacting system, with the property that this layer acts as an etching mask during a subsequent trench-etching process;
   e) producing a back mask and carrying out a back-etching process, an oxide layer of the SIMOX substrate, an oxide layer of the SOI substrate or an oxide layer provided on the silicon start layer acting as an etch stop;
   f) carrying out etching from the back of the structure for removing the oxide layer; and
   g) carrying out a subsequent trench-etching process so as to form and expose the seismic mass and the connecting device of the acceleration threshold sensor.

2. The method according to claim 1 for producing an acceleration threshold sensor comprising a supporting device; a seismic mass; and a connecting device with the aid of which the seismic mass is attached to the supporting device, said connecting device being provided with a predetermined breaking point interrupting the connection between the seismic mass and the supporting device when said seismic mass is subjected to an acceleration exceeding a predetermined acceleration, wherein the supporting device, the seismic mass and the connecting device are formed integrally from a silicon layer by means of a micromechanical method in such a way that the silicon layer is provided with an opening extending therethrough and having arranged therein the seismic mass, the border of said opening defining the supporting device, the seismic mass being connected on a first side thereof to the neighboring side of the supporting device by a first bar-shaped connection piece which defines the predetermined breaking point, and said seismic mass being connected to the side of the supporting device located opposite said neighboring side by means of a second and a third connection piece, said second and third connection pieces being connected to the seismic mass in the area of the first side of said seismic mass and extending symmetrically on both sides of the seismic mass to the opposite side of the supporting device, said second and third connection pieces being implemented such that they do not substantially influence the mechanical properties of the seismic mass.

3. The method according to claim 1, comprising the additional method step of producing a doped area in the deposited silicon epitaxial layer after the application of said silicon epitaxial layer.

4. The method according to claim 1, wherein, after trench etching, the passivation layer serves as a passivation of the doped areas, of the metallization system and of the contacting system.

5. The method according to claim 1, comprising the additional method step of applying a protective layer to and structuring it on the front of the structure before the trench-etching and removing said protective layer after the trench-etching.

6. The method according to claim 1, comprising the additional method step of applying a complete or a partial protective layer to the back before the trench etching and removing said protective layer after the trench etching.

7. The method according to claim 1, comprising the additional method step of trench etching making use of a photoresist mask.

* * * * *